Aug. 16, 1966      H. NAVARRO      3,266,562
DEVICE FOR COOLING A METALLIC MASS AND THERMAL
PROTECTION SYSTEM COMPRISING SAID DEVICE
Filed Dec. 2, 1963                3 Sheets-Sheet 1

INVENTOR
HENRI NAVARRO

BY Bacon & Thomas
ATTORNEYS

United States Patent Office 3,266,562
Patented August 16, 1966

3,266,562
DEVICE FOR COOLING A METALLIC MASS AND THERMAL PROTECTION SYSTEM COMPRISING SAID DEVICE
Henri Navarro, Fresnes, France, assignor to Societe Alcatel, Paris, France
Filed Dec. 2, 1963, Ser. No. 327,381
Claims priority, application France, Dec. 17, 1962, 918,893
6 Claims. (Cl. 165—47)

The present invention relates to a device for cooling a metallic mass, more particularly a mass which surrounds at least partially a heat source and especially a mass through which passes a hot fluid duct.

It is, in fact, a matter of importance in many cases to ensure that the temperature of metallic masses located in the vicinity of a heat source cannot reach excessive values. Similarly, it is often necessary to maintain such masses as close as possible to ambient temperature in order not to produce any harmful effect on the devices and equipment units to which the masses are mechanically coupled. Systems for cooling by fluid circulation are at present provided with this object in view. However, such systems unfortunately require the presence of a large number of conduits and pumping systems which take up relatively substantial space and furthermore are not very effective when the external surface of the metallic mass is not very large.

The object of the present invention is primarily to overcome the disadvantage which has just been noted by making it possible to remove heat from a metallic mass in a more effective manner and also to maintain said mass at a fairly low temperature even when the available volume is small.

The invention is directed to a device for cooling a metallic mass which surrounds at least partially a heat source and which comprises firstly a system of rods fabricated of a material having good thermal conductivity, said rods being set at intervals within said metallic mass and coupled to at least one thermal conductor which picks up the heat absorbed by the rods and, secondly, a device located outside said metallic mass for the removal of heat from said pick-up conductor or conductors.

The present invention also extends to a thermal protection system which comprises on the one hand, between the heat source and the metallic mass, a thermal insulator which surrounds said heat source to at least a partial extent and, on the other hand, a device for cooling the metallic mass and comprising, set at intervals within said mass, a plurality of metallic rods fabricated of a material having good thermal conductivity, at least one heat collector and means for cooling said heat collector or collectors and for the removal of heat.

The heat which is supplied to the metallic mass from the heat source is thus progressively absorbed by the system of rods, then discharged to the exterior, and cannot reach the vicinity of the equipment unit to be protected. Said equipment unit is therefore in contact with a metallic mass which remains at a low temperature and is not liable to be damaged by heat even if the equipment unit is very sensitive.

Various other characteristic features and advantages will in any case be brought out by the detail description which follows in connection with one form of embodiment of a thermal protection system in accordance with the invention which is given by way of nonlimitative example and illustrated in the accompanying drawings, wherein.

Figure 1:
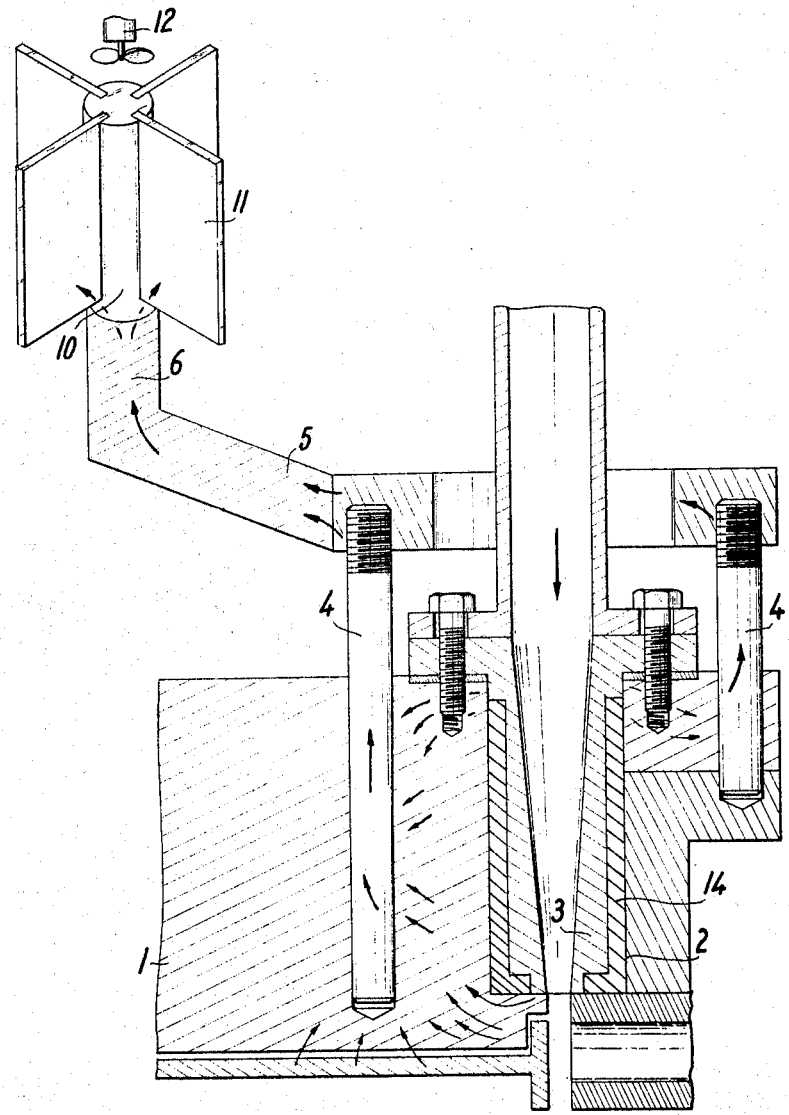
FIG. 1 shows diagrammatically a thermal protection system comprising a cooling device in accordance with the invention.
Figure 2:
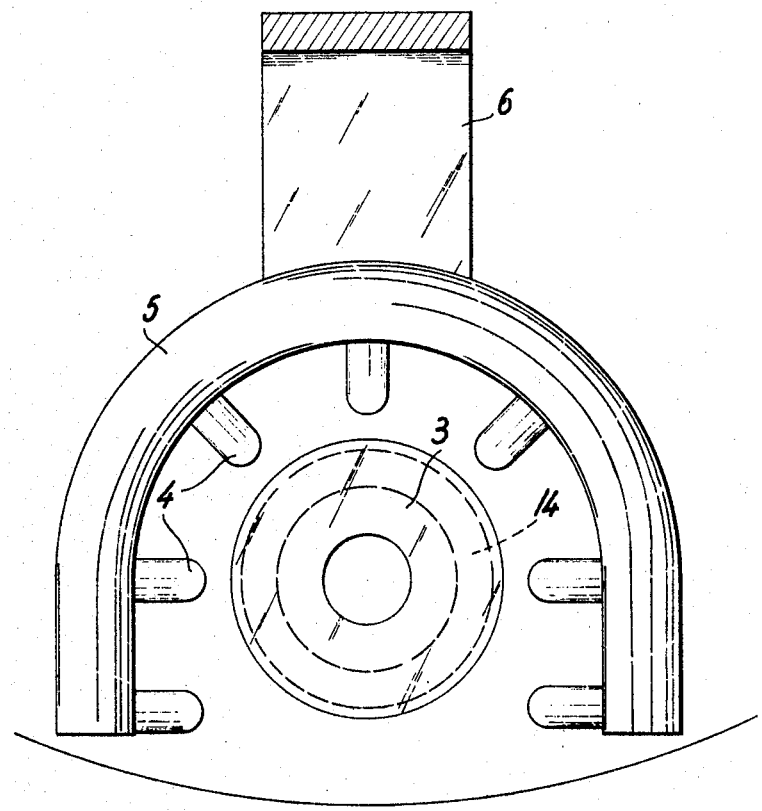
FIG. 2 shows the position of the cooling device of FIG. 1 disposed around the heat source.

As shown in FIG. 1, the metallic mass 1 to be cooled is bored so as to provide a passage 2 in which is fitted a conduit 3 for the purpose of circulating therein at very high temperature a fluid which constitutes a heat source. Rods 4 which are fabricated of materal having very good thermal conductivity such as copper, for example, are inserted parallel to the conduit 3 within bores of the mass 1. Said rods are set at intervals around said conduit 3 (as shown in FIG. 2) and are secured to a thermal conductor 5 having a cross-sectional area which is distinctly greater than that of the rods 4 and having an incurved shape in such manner as to surround the conduit 3. Said conductor 5 is fitted with an elbowed arm 6 which is directed outwards from the mass 1 and which terminates in a cylinder 10 fitted with fins 11 for the exchange of heat with the surrounding air.

The heat contained in the mass 1 is thus absorbed by conduction in the copper rods 4, then transported up to the fins 11 via the conductors 5 and 6, the thermal resistance of which is very low, then discharged by radiation into the atmosphere. A fan 12 serves to accelerate the circulation of air around the fins 11 and thus improves the removal of heat.

The process of heat absorption and removal is indicated by arrows in FIG. 1.

In order to achieve effective thermal protection of a unit which is in contact with the metallic mass 1, use is preferably made of a system of rods comprising a number of groups of rods mounted in different directions within the interior of the mass, each group being coupled to a separate thermal conductor and all the conductors being secured to the heat-transfer cylinder.

An insulating barrier 14 interposed between the wall of the passage 2 and the fluid conduit 3 reduces to a considerable extent the number of calories per second supplied by the heat source to the metallic mass 1 and consequently to the rods 4.

Figure 3:
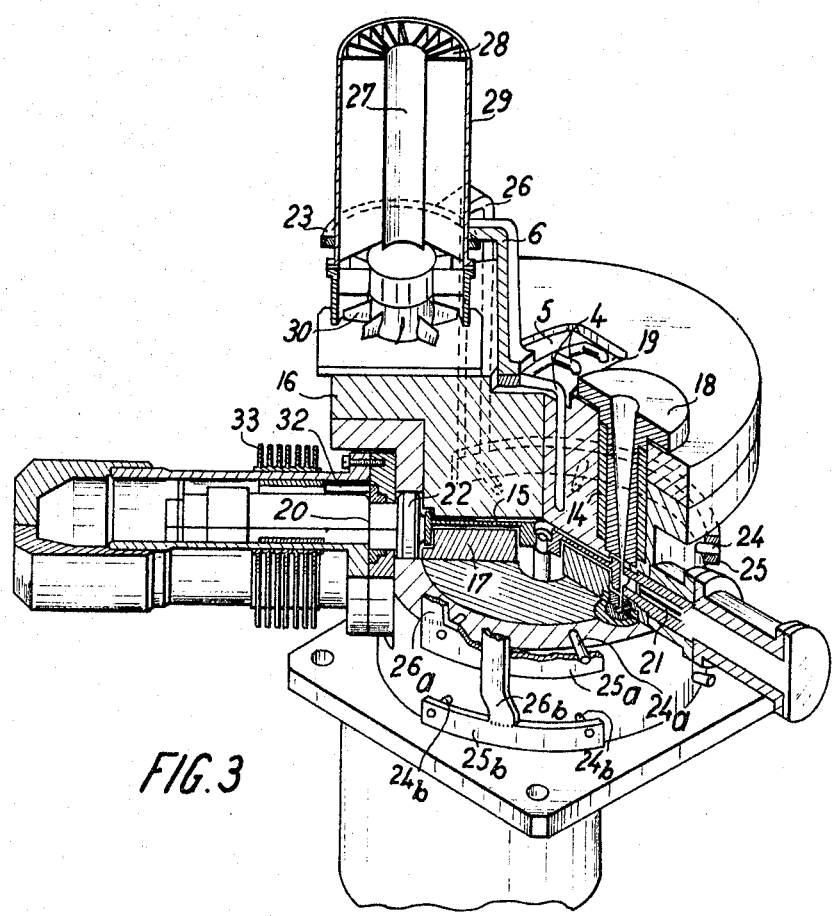
FIG. 3 is a view, partly in section, of a burst can detector fitted with a thermal protection system in accordance with the invention.

In the example of application which is represented in FIG. 3, the thermal protection system is mounted on a can burst detection device in atomic reactors of the type described in U.S. Patent 3,084,252, on June 3, 1959, and patent application No. 29,683 on May 17, 1960, now Patent No. 3,136,891, of C.E.A.

The above-mentioned detector comprises a rotary drum 15 which is enclosed between two metallic blocks 16 and 17 of substantially cylindrical external configuration which are traversed by a conduit 18 through which the coolant to be analyzed is intended to flow in proximity to a predetermined surface of the wall of drum 15. An electrode 21 for the repulsion of radioactive ions contained in the fluid towards the surface of the drum 15 and a scintillator 22 for detecting the activity of ions collected on said surface are mounted in two radial openings of the blocks 16 and 17. A control device, not shown in the drawings, drives said drum 15 in rotation in such a manner as to bring the surfaces of this latter successively opposite the ion-collection chamber then opposite the scintillator 22. In an apparatus of this type, the scintillator 22 is associated with a multiplier photo-tube 20 and with a counting unit which has not been shown in the drawings. In point of fact, the multiplier photo-tube is a fairly delicate unit which is unable to withstand high temperatures whereas the fuel coolant of a nuclear reactor which arrives in the conduit 18 is at a temperature which usually reaches 300 to 400° C. A good thermal protection of the multiplier photo-tube is consequently a very necessary feature; it is easier to operate a mechanical assembly at a higher temperature.

In accordance with the present invention, the aforesaid detector comprises between the conduit 18 which forms the heat source and the wall of the blocks 16 and 17 a barrier 14 of heat-insulating material. Set a small distance away from said barrier 14 is a series of rods 4 which are fabricated of a material having a good thermal conductivity and which are inserted into the mass of the block 16 parallel to the axis of conduit 18. Said rods 4 are elbowed at the top thereof in the vicinity of the outer wall of block 16 and welded to a thermal conductor 5 which is substantially curved into a U-shape around the conduit 18. Said conductor 5 is housed in a hollowed-out portion 19 of the said block 16. An elbowed arm 6 of the same material as the conductor 5 and the rods 4 is secured at one end thereof to said conductor 5 and at the other end thereof to a ring 23 which is integral wtih a heat-removal device constituted by two coaxial cylinders 27, 29 which are joined together by fins 28, the outer cylinder 29 being intended to receive the heat of the ring 23 whilst heat-absorbing air is circulated within the inner cylinder 27 and the spaces between the fins 28. A ventilating-fan 30 which is mounted between the block 16 and the cylinders 27, 29 and coaxially with these latter accelerates the circulation of the cooling air.

Other conductor rods 24 are inserted radially within the blocks 16 in a same wide circle as this latter and are coupled to a thermal conductor 25a forming a circular arc around the block 16 outside this latter. An elbowed arm 26 which is similar to the arm 6 couples the conductor 25 to the ring 23.

A second and even a third group of rods 24a, 24b are inserted into the blocks 16 and 17 parallel to the rods 24. The rods of each group are coupled to a conductor 25a or 25b which is similar to the conductor 25 and which comprises an arm 26a or 26b for joining said conductor to the ring 23.

The heat generated at various points of the blocks 16 and 17 is thus absorbed by the rods 4 and 24, 24a, 24b and transmitted successively to the conductors 5, 25, 25a, 25b, then to the arms 6, 26, 26a, 26b and to the ring 23 so as to be dissipated in the surrounding air in contact with the cylinders 27, 29 and the fins 28. The detector unit is thus maintained at a fairly low temperature, the temperature gradient between the heat source and the blocks 16 and 17 being very high.

However, in the case of the detector which has just been described, and inasmuch as the multiplier phototube is a device which is extremely sensitive to heat, it can be an advantage to complete the protection which is thus obtained by the addition in proximity to this latter of a small plate 32 for cooling by the Peltier effect and by the further addition around the multiplier photo-tube unit as a whole of fins 34 for the exchange of heat with the outer air, the result thereby achieved being to reduce the temperature of the photoelectric cathode to a temperature which is lower than that of the surrounding atmosphere.

The overall size and arrangement of the system of rods are determined by the value of the temperature gradient to be obtained as well as by the conducting material which is employed. These rods are in close contact with the metallic mass and can even be welded to this latter. The action of the barrier makes it possible in addition to reduce the number of rods.

A unit which is secured to a metallic mass can thus be maintained at a fairly low temperature without circulation of fluid by means of a device of relatively small bulk, the major part of which is embedded in the metallic mass itself.

In the above example of embodiment, there has been described the application of a thermal protection system in accordance with the invention to a nuclear reactor can-burst detector, but it remains wholly apparent that said protection system could be put to use in any other device for the protection of a unit which is mechanically coupled by means of a metallic mass to a heat source and which does not withstand the temperature reached by said source. The cooling device also makes it possible to remove the heat of any metallic mass which is in at least partial contact with a heat source and could be employed in particular for an electrovalve.

A number of different modifications could also be made in the form of embodiment which has been described by way of example in the foregoing, without thereby departing from the scope or the spirit of the invention.

What I claim is:

1. Apparatus for cooling a hot metallic mass of substantially cylindrical configuration having a passage extending longitudinally therein for the circulation therethrough of a hot fluid, comprising: a first series of parallel rods of high thermal conductivity set at regular, spaced intervals in said mass around said passage and parallel to the axis thereof; a second series of rods of high thermal conductivity set in said metallic mass around said passage in a plane disposed radially with respect to the axis of said passage; a semiannular thermal conductor located outside said metallic mass thermally connected with each of said first series of rods; a curved thermal conductor located outside said metallic mass and extending circumferentially parallel to the side wall thereof thermally connected with each of said second series of rods; heat conducting arms extending outwardly from said semiannular conductor and from said curved conductor; and a heat removal device spaced from said metallic mass and thermally connected with said arms of said semiannular and said curved thermal conductors for the removal of heat from both of said conductors.

2. Apparatus for cooling a hot metallic mass as defined in claim 1 in which said heat removal device comprises a heat exchange tube heated by the heat conducted thereto by said arms; guide means within said tube for guiding a heat removal fluid therethrough and a ventilating fan connected with said tube for moving the heat removal fluid through said heat exchange tube.

3. A device for the thermal protection of a unit which is in the vicinity of a heat source and which does not withstand the temperature of said source, said unit being mechanically coupled to said source by means of a metallic mass, said device comprising a thermal insulator disposed between said heat source and said metallic mass and surrounding, to at least a partial extent, said heat source; and means for cooling said metallic mass comprising a plurality of metallic rods fabricated of a material having good thermal conductivity set at spaced intervals within said metallic mass, at least one heat collector thermally connected with said rods; and means for cooling said collector.

4. Apparatus for cooling a hot metallic mass having a longitudinal passage therein for the circulation therethrough of a hot fluid, comprising: a first series of parallel rods of high thermal conductivity set at regular, spaced intervals in said mass around said passage and parallel to the axis thereof; a second series of rods of high thermal conductivity set in said metallic mass around said passage in a plane disposed at an angle with respect to the axis of said passage; a first metallic thermal conductor located outside said metallic mass thermally connected with each of said first series of rods; a second metallic thermal conductor located outside said metallic mass and thermally connected with each of said second series of rods; and a heat removal device spaced from said metallic mass and thermally connected with said first and said second thermal conductors for the removal of heat from both of said conductors.

5. Apparatus for cooling a hot metallic mass having a longitudinal passage therein for the circulation therethrough of a hot fluid, comprising: a first series of rods of high thermal conductivity set at spaced intervals in said mass around said passage and disposed substantially parallel to said passage; a second series of rods of high thermal conductivity set at spaced intervals in said mass around said passage and disposed generally laterally to said passage; a third series of rods of high thermal conductivity set at spaced intervals in said mass around said passage disposed generally laterally to said passage and spaced laterally with respect to said second series of rods; a first, second and third thermal conductor located outside said mass and thermally connected with said first, second and third series of rods respectively; and a heat removal device spaced from said mass and thermally connected with said first, second and third thermal conductors for the removal of heat from each of said conductors.

6. Apparatus for cooling a hot metallic mass having a longitudinal passage therein for the circulation therethrough of a hot fluid providing a heat source comprising: a series of parallel rods of high thermal conductivity set at spaced intervals in said mass around said passage; a metallic thermal conductor located outside said metallic mass thermally connected with each of said rods; a heat removal device spaced from said metallic mass and thermally connected with said thermal conductor for the removal of heat therefrom, and a thermal insulator disposed between said heat source and said metallic mass and surrounding, to at least a partial extent, said heat source.

References Cited by the Examiner

UNITED STATES PATENTS

| | | | |
|---|---|---|---|
| 2,343,049 | 2/1944 | Fassinger | 165—179 X |
| 2,947,152 | 8/1960 | Bloem | 165—185 X |
| 2,979,644 | 4/1961 | Salzer | 317—234 |
| 3,066,222 | 11/1962 | Poorman et al. | 165—47 X |
| 3,149,666 | 9/1964 | Coe | 165—121 |

ROBERT A. O'LEARY, *Primary Examiner.*

CHARLES SUKALO, *Examiner.*

A. W. DAVIS, *Assistant Examiner.*